United States Patent
Bogovic et al.

(10) Patent No.: US 8,301,744 B2
(45) Date of Patent: Oct. 30, 2012

(54) SYSTEMS AND METHODS FOR QOS PROVISIONING AND ASSURANCE FOR POINT-TO-POINT SIP SESSIONS IN DIFFSERV-ENABLED MPLS NETWORKS

(75) Inventors: Tony Bogovic, Denville, NJ (US); Shrirang Gadgil, Eatontown, NJ (US); Gi Tae Kim, Morristown, NJ (US); Narayanan Natarajan, Marlboro, NJ (US); Abdelhakim Hafid, Laval (CA)

(73) Assignee: Telcordia Technologies, Inc., Piscataway, NJ (US)

( * ) Notice: Subject to any disclaimer, the term of this patent is extended or adjusted under 35 U.S.C. 154(b) by 365 days.

(21) Appl. No.: 12/188,421

(22) Filed: Aug. 8, 2008

(65) Prior Publication Data
US 2010/0036953 A1      Feb. 11, 2010

(51) Int. Cl.
G06F 15/173     (2006.01)
G06F 15/16      (2006.01)
H04L 12/26      (2006.01)

(52) U.S. Cl. ........ 709/223; 709/225; 709/246; 370/230; 370/235

(58) Field of Classification Search .................. 709/226, 709/227, 238, 223, 225, 246; 370/230, 352, 370/389, 392, 395.52, 397, 401, 229, 235; 455/407
See application file for complete search history.

(56) References Cited

U.S. PATENT DOCUMENTS

| | | | | |
|---|---|---|---|---|
| 6,674,718 B1 * | 1/2004 | Heddes et al. | ................ | 370/230 |
| 7,586,899 B1 * | 9/2009 | Mohaban et al. | ............. | 370/352 |
| 2001/0027490 A1 * | 10/2001 | Fodor et al. | ................... | 709/238 |
| 2003/0112756 A1 * | 6/2003 | Le Gouriellec et al. | ...... | 370/230 |
| 2003/0172160 A9 * | 9/2003 | Widegren et al. | ............. | 709/226 |
| 2004/0081092 A1 | 4/2004 | Rhee et al. | | |
| 2005/0117576 A1 * | 6/2005 | McDysan et al. | ............. | 370/389 |
| 2006/0268824 A1 | 11/2006 | Dhesikan et al. | | |
| 2006/0277280 A1 | 12/2006 | Craggs | | |
| 2007/0058639 A1 * | 3/2007 | Khan | ........................ | 370/395.52 |
| 2007/0076599 A1 * | 4/2007 | Ayyagari et al. | .............. | 370/229 |
| 2007/0086433 A1 | 4/2007 | Cunetto et al. | | |
| 2007/0150938 A1 | 6/2007 | Moon et al. | | |
| 2007/0211738 A1 * | 9/2007 | Guo | .............................. | 370/401 |
| 2007/0237160 A1 * | 10/2007 | Natarajan et al. | ............. | 370/397 |
| 2008/0056151 A1 | 3/2008 | Gazier et al. | | |
| 2008/0062985 A1 * | 3/2008 | Agarwal et al. | ............... | 370/392 |
| 2008/0076385 A1 * | 3/2008 | Mayer et al. | .................. | 455/407 |
| 2008/0089324 A1 * | 4/2008 | Polk et al. | ..................... | 370/389 |
| 2008/0101239 A1 * | 5/2008 | Goode | ......................... | 370/235 |
| 2008/0168172 A1 * | 7/2008 | Keller et al. | .................. | 709/227 |

OTHER PUBLICATIONS

International Search Report dated Sep. 15, 2009.

* cited by examiner

*Primary Examiner* — Aaron Strange
(74) *Attorney, Agent, or Firm* — Philip J. Feig

(57) ABSTRACT

Systems and methods for efficiently provisioning and assuring Quality of Service (QoS) between user networks communicating over a DiffServ-enabled network, with QoS management transparency to SIP user agents. The system comprises user networks communicating via a core network, each user network having a source and destination SIP user agent respectively, a SIP proxy server between the source SIP user agent and destination SIP user agent, a Bandwidth Manager to provision a pipe between the source user network and the destination user network, wherein the pipe has a specified bandwidth, and a QoS Agent for accepting and/or rejecting a SIP session based on availability of bandwidth in the pipe; wherein the SIP proxy server is configured to forward an incoming SIP request to the QoS Agent. The method comprises provisioning a pipe between the SIP user agents or their respective user networks, and allowing/rejecting incoming SIP sessions based on the available bandwidth in the pipe.

11 Claims, 8 Drawing Sheets

SYSTEMS AND METHODS FOR QOS PROVISIONING AND ASSURANCE FOR POINT-TO-POINT SIP SESSIONS IN DIFFSERV-ENABLED MPLS NETWORKS

FIELD OF THE INVENTION

The present invention relates to digital telecommunications networks. Specifically, the present invention relates to providing real-time adjustable Quality of Service (QoS) for point-to-point Session Initiation Protocol (SIP) sessions over a digital telecommunications network such as the Internet.

BACKGROUND OF THE INVENTION

Session Initiation Protocol (SIP) is the signaling protocol of choice for session initiation and termination in the Internet (See Rosenberg J., Schulzrinne, H., Camarillo, G., Johnston, A., Peterson, J., Sparks, R., Handley, M. and E. Schooler, "SIP: Session Initiation Protocol", RFC 3261, June 2002). SIP supports voice, video, and multimedia sessions that are very sensitive to the Quality of Service (QoS) provided by the underlying network.

There have been a lot of efforts to provide QoS for SIP-based sessions. The proposed solutions fall into two classes: (1) QoS reservations are serviced by SIP user agents (See Marshall, B. (ed), *Private Session Initiation Protocol (SIP) Extensions for Media Authorization*, RFC3313, 2003, and Camarillo, G., Marshall, B., Rosenberg, J., *Integration of Resource Management and Session Initiation Protocol (SIP)*, RFC3312, 2002); and (2) QoS reservations are serviced by SIP servers (See Salsano, S., Veltri, L., *QoS Control by Means of COPS to Support SIP-Based Applications, IEEE Network*, March/April 2002). Both classes of solutions require modifications to the currently deployed SIP infrastructure. For example in Marshall, the basic concept mandates SIP user agents to use Resource Reservation Protocol (RSVP) for bandwidth reservation during the SIP call setup. In this case, the caller or source sends a SIP message (i.e., Invite) specifying that a bandwidth reservation is needed (e.g., using a pre-condition field in the SIP Invite); upon receipt of the SIP message, the callee or destination starts resource reservation by sending a RSVP path message (the caller also starts the process of resource reservation in the case of a bidirectional call). If the reservation is successful, the normal SIP flow of messages continues (an OK message towards the caller followed by an ACK message towards the callee).

Thus, existing solutions for providing QoS for SIP sessions suffer from a number of limitations such as the requirement for modifications to the currently deployed SIP infrastructure including SIP user agents and servers, the lack of scalability since they require interactions with the underlying network for resource reservations for each SIP session, a serious impact on the SIP session setup response time since they require interactions with the resource reservation system during the session setup; and inflexibility since they cannot be parameterized or policy-driven. No scheme has yet been identified in the public literature that supports QoS provisioning and assurance for SIP sessions without requiring amendments/modifications to the SIP infrastructure. Existing schemes require either SIP agents/clients to make the necessary resource reservations using, for example, RSVP (see Media Authorization with RSVP in Marshall and Preconditions in Camarillo) or propose changes to the SIP server to handle QoS provisioning in Salsano. In addition to these drawbacks, they are also not scalable since they require resource reservations per SIP session; e.g., for each session, RSVP is used to establish reservations. Assuming arrival of thousands or hundreds of thousands of concurrent session setup requests, as will be the case in public networks, this may have a considerable impact on the performance of the system including the underlying network.

SUMMARY OF THE INVENTION

The present invention provides systems and methods for provisioning and assuring Quality of Service (QoS) between SIP user agents over a DiffServ-enabled network, with QoS management transparency to SIP user agents. In one embodiment, the present invention is a system for assuring quality of service (QoS) for a SIP session between a source user network and a destination user network communicating via a core network, each user network having a source and destination SIP user agent respectively, the system comprising a SIP proxy server between the source SIP user agent and destination SIP user agent, a Bandwidth Manager to provision a pipe between the source user network and the destination user network, wherein the pipe has a specified bandwidth, a QoS Agent for accepting and/or rejecting a SIP session based on availability of bandwidth in the pipe, wherein the SIP proxy server is configured to forward an incoming SIP request to the QoS Agent, and a Session Border Controller between each user network and the core network to police incoming traffic. Each pipe is used to transport data flows contained in different SIP sessions between the source user network and destination user network.

The system further comprises an access network between each user network and the core network, such that the Session Border Controller polices traffic incoming from the access network to the core network, wherein the SIP user agents are configured to send their SIP messages to the Session Border Controller between said access network and the core network. The Session Border Controllers are configured to send the SIP messages to the SIP proxy server.

The core network is a DiffServ network, so that the Bandwidth Manager provisions the pipe with an initial bandwidth based on a DiffServ class for incoming traffic to be transported by the pipe. The initial bandwidth for a pipe provisioned between each pair of user networks is based on projected traffic demand between the pair. The QoS Agent increases or decreases the bandwidth of the pipe based on a plurality of predefined policies, the QoS Agent further comprising a SIP Engine to intercept and process SIP messages, a Call Admission Control in communication with the SIP Engine to determine session admissions, and a QoS Agent database. The QoS Agent Database further comprises a pipes table containing a plurality of records about pipes in the core network, a policies table containing information about policy type and corresponding attributes, and a sessions table containing formation about currently active sessions in the network, wherein the Call Admission Control keeps track of sessions in the network by creating a session record each time a session starts and deleting the record of a session that terminates.

In another embodiment, the present invention is a Quality of Service (QoS) Agent on a DiffServ-enabled network, wherein the DiffServ-enabled network interconnects a plurality of user networks, each user network hosting a SIP user agent, the QoS Agent comprising a SIP Engine to intercept and process SIP messages from a SIP user agent, a Call Admission Control in communication with the SIP Engine to determine session admissions, and a QoS Agent database. The Call Admission Control is in communication with a Bandwidth Manager, said Bandwidth Manager provisioning a pipe between at least two SIP user agents, said pipe providing a bandwidth that is specified by the DiffServ type of content being transmitted between the SIP user agents. The Call Admission Control rejects a SIP session if there is insufficient bandwidth in the pipe. The Call Admission Control refers to the QoS Agent database to determine when to accept or reject a SIP session.

The QoS Agent Database further comprises: a pipes table containing a plurality of records about pipes in the core network; a policies table containing information about policy type and corresponding attributes; and a sessions table containing information about currently active sessions in the network, wherein the Call Admission Control keeps track of sessions in the network by creating a session record each time a session starts and deleting the record of a session that terminates.

In another embodiment of the present invention, a method is provided for assuring Quality of Service (QoS) in a SIP session between at least two SIP user agents communicating across a DiffServ-enabled network, the method comprising provisioning a pipe between each pair of user networks, said pipe having a bandwidth that is determined based on a projected traffic for a DiffServ class between the user network pair, checking for available bandwidth in the pipe for each incoming traffic flow of the SIP session, and accepting or rejecting an incoming SIP session based on the available bandwidth. The method further comprises defining a plurality of policies for provisioning of the pipe, including a pipe bandwidth increase policy, a pipe bandwidth decrease policy, and a session QoS degradation policy. The above mentioned policy-based QoS provisioning and admission control occurs transparent to SIP user agents.

The method further comprises sending all incoming SIP session requests to a QoS Agent, said QoS Agent comprising a SIP Engine, a Call Access Control, and a QoS Agent database. The method further comprises marking and policing an incoming packet in a session using a Session Border Controller (SBC), said SBC marking and policing packets between an access network and the DiffServ-enabled network. The process of marking and policing of incoming packets by the SBC is configured by the QoS Agent.

Checking for available bandwidth further comprises: determining the session bandwidth requirement from a header in the incoming SIP session; and determining the available bandwidth in the pipe by communicating with the Bandwidth Manager. The Call Admission Control keeps track of sessions in the network by creating a session record each time a session starts and deleting the record of a session that terminates.

DETAILED DESCRIPTION OF THE INVENTION

The invention describes a new scheme for QoS provisioning and assurance for point-to-point SIP sessions that does not have the limitations of existing solutions. The proposed solution maintains compatibility with SIP components as defined in SIP standards described in RFC3261, and thus SIP components can be integrated into the invention without modification. The present invention supports fast admission control for SIP calls since it does not require interactions, per session, with the network QoS mechanisms for resource reservation. Furthermore, the present invention is policy driven, i.e. the QoS mechanisms can change their behavior depending on the provisioning policies in use.

The present invention is further deployable in single (i.e., network operated by a single service provider) or multiple network domains, and supports point-to-point SIP sessions. A single network domain or service provider network would be required to provide various DiffServ classes (e.g., EF, AF1, AF2, etc.) of traffic enabled/configured within the MPLS core network of the service provider.

Figure 1:
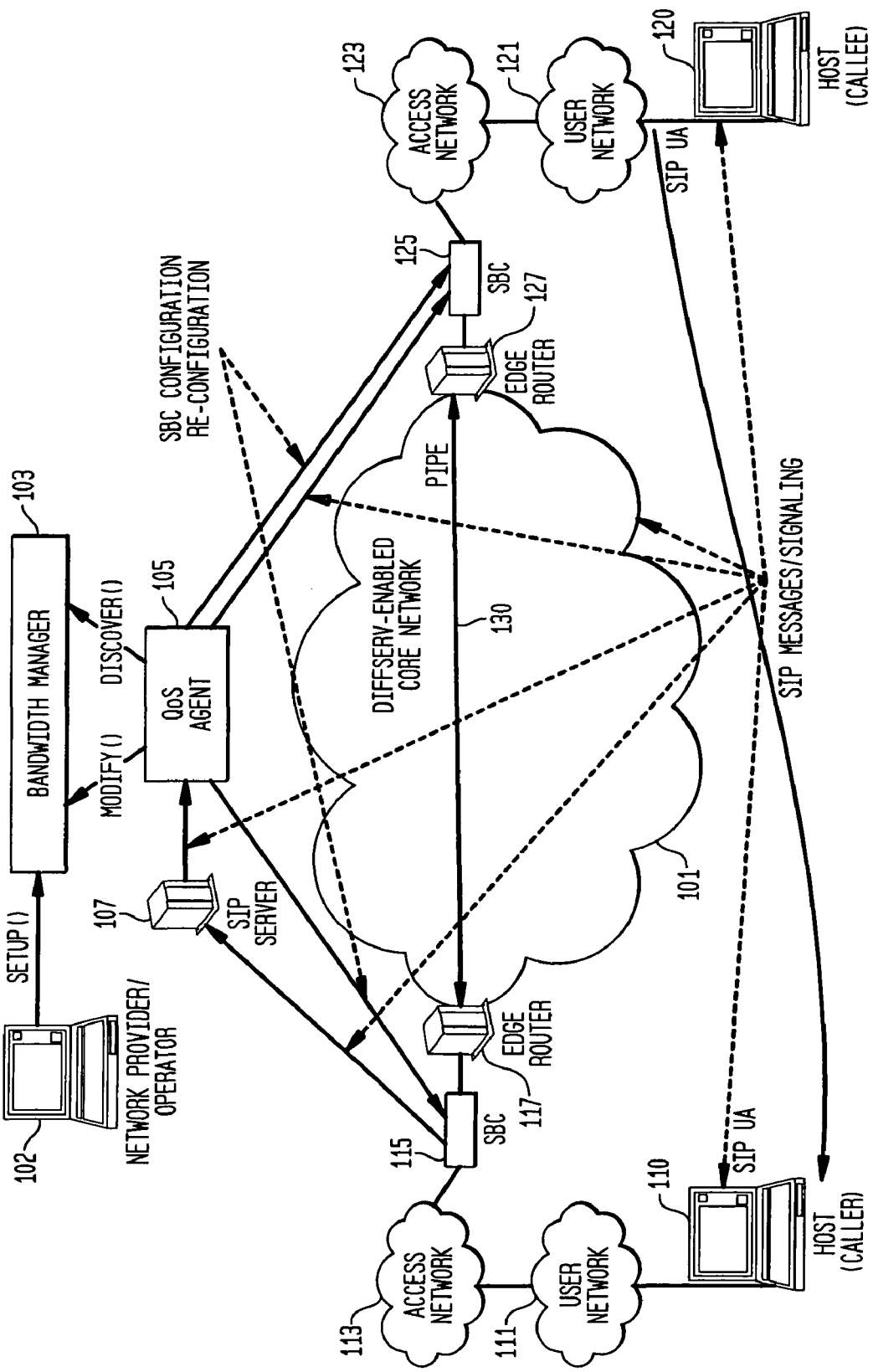
FIG. 1 shows the architecture of a system, according to an exemplary embodiment of the present invention.

FIG. 1 shows the architecture of the proposed solution, according to an exemplary embodiment of the present invention. The solution supports a network environment where user (or enterprise) networks are interconnected through a service provider network. The service provider network consists of a DiffServ enabled MPLS core network 101 and multiple access networks. Source user network 111 is connected to source access network 113, destination user network 121 is connected to destination access network 123, and the access networks are interconnected by the core network 101.

A point-to-point SIP session originates in source host 110 in user network 111, and terminates in destination host 120 in user network 121. In the context of one SIP session, different types of information (voice, data, video) may be exchanged between the hosts that participate in the session. QoS provisioning for SIP sessions in the core network is accomplished using the concept of pipes. For every pair of user networks (i.e. source and destination), a pipe is set up in each direction. In the present case, pipe 130 is used to transport data flows of SIP sessions from source user network 111 to the destination user network 121 across the service provider network 130. Each flow within a SIP session may belong to a different DiffServ class. Thus, pipe 130 is created with a specific bandwidth value for each DiffServ class traffic aggregate that is to be transported by the pipe 130. The Bandwidth Manager (BM) 103 manages the network resources in the core network 101 to provision pipe 130. Pipe 130 is initially set up based on predicted traffic demands between user network pairs. Thereafter, the bandwidth of pipe 130 is dynamically increased and decreased to adapt to changes in traffic demands. This process is described later. A QoS Agent 105 is responsible for admitting/rejecting SIP sessions based on bandwidth availability in pipes 130 and governing established policies. Accepting or rejecting a session consists of a simple check for the availability of bandwidth for each flow of the session in the pipe that is designated to transport the flow. More detail on this will be provided below.

The functions of SIP User Agents and the Proxy Server 107 are consistent with the specifications found in SIP standards. These components are used in the proposed solution. The proposed solution does not require any changes to the existing SIP infrastructure including SIP User Agents and SIP proxies.

The only requirement is that the SIP proxy 107 should be configured to forward all SIP requests (or methods) to the QoS Agent 105. SIP Proxy 107 and QoS Agent 105 may be co-located in the same machine or run on different machines. The SIP Proxy 107 performs its usual processing and instead of forwarding the request to the destination, it forwards the request to the QoS Agent 105. Thus, User Agents and the Proxy Server 107 need not participate in any signaling for resource management; it is the role of the QoS Agent 105 to perform resource management.

Session Border Controllers (SBC) 115 and 125 are deployed at the interconnection point between each access network 113/123 and the core network 101. The SBCs 115 and 125 perform packet marking and policing functions for flows in SIP sessions. Packets belonging to a flow of an admitted SIP session are marked with DiffServ Code Points (DSCPs) by the ingress SBC, i.e., the SBC that is facing the source user network of the flow, based on policies configured in the SBCs. QoS agent 105 performs this policy configuration using the management interfaces supported by the SBC equipment. The ingress SBC also polices the incoming traffic to ensure that the rate does not exceed the QoS that has been provisioned for the flow.

Initial Configuration:

The following initial configuration is performed on SIP User Agents, the Proxy Server 107, and SBCs 115/125, which happens prior to operation of the proposed scheme. SIP User Agents are configured to send their SIP messages to the SBC that is connected to user network via the access network. This configuration consists of configuring the IP address and port number of the proxy entity in SIP User Agents. For instance, SBCs may operate as SIP back-to-back user agents. SBCs 115/125 are configured to send SIP messages to the SIP Proxy Server 107 in the network. The SBCs are also configured with the required marking and policing policies using management interfaces supported by the SBCs. Service provider 102 defines and instructs SBCs as to how to mark session traffic (e.g., mark VoIP with EF) and to police session traffic (e.g., discard excess traffic, mark excess traffic with best effort). The SIP Proxy server 107 is configured to forward all SIP requests/messages to the QoS Agent 105.

The Bandwidth Manager (BM) 103 provides on-demand bandwidth service in the form of creation and modification of pipes 130. BM 103 supports an API that allows the setup of pipes between user networks. Each pipe 130 is set up with a specific bandwidth for each DiffServ class traffic that can be transported by the pipe. The scope of bandwidth management for pipes is limited to the core network. BM 130 also allows modifications (i.e., increase and decrease) to the bandwidth of an already existing pipe 130. Pipes 130 are setup for an aggregate of expected sessions, not per session basis. For example, a pipe 130 can be setup for an expected 10000 sessions, between two user networks, with an average of 64 Kbps per session. The QoS Agent 105 can increase the bandwidth of this pipe based on the predefined policies described above. The BM 103 also provides a primitive for the discovery of pipes that currently exist in the network. The QoS Agent 105 uses this discovery function during its initialization to get the list of pipes already setup. The QoS Agent 105 makes use of these pipes to perform admission control upon receipt of session requests. BM 103 provides other functions such as:

Setup( )—Input: source user subnet, destination user subnet, bandwidth per DiffServ class; Output: pipe identifier if the pipe is established or nullified if the pipe cannot be setup Modify( )—Input: pipe identifier, bandwidth per DiffServ class; Output: true if the modification is successful, false otherwise.

Discover( )—Input: list of (source user subnet, destination user subnet); Output: list of pipes with their attributes; i.e., a list of tuples of the following form: PipeId, Source Subnet, Destination Subnet, bandwidth (BW) per DiffServ class.

Figure 2:
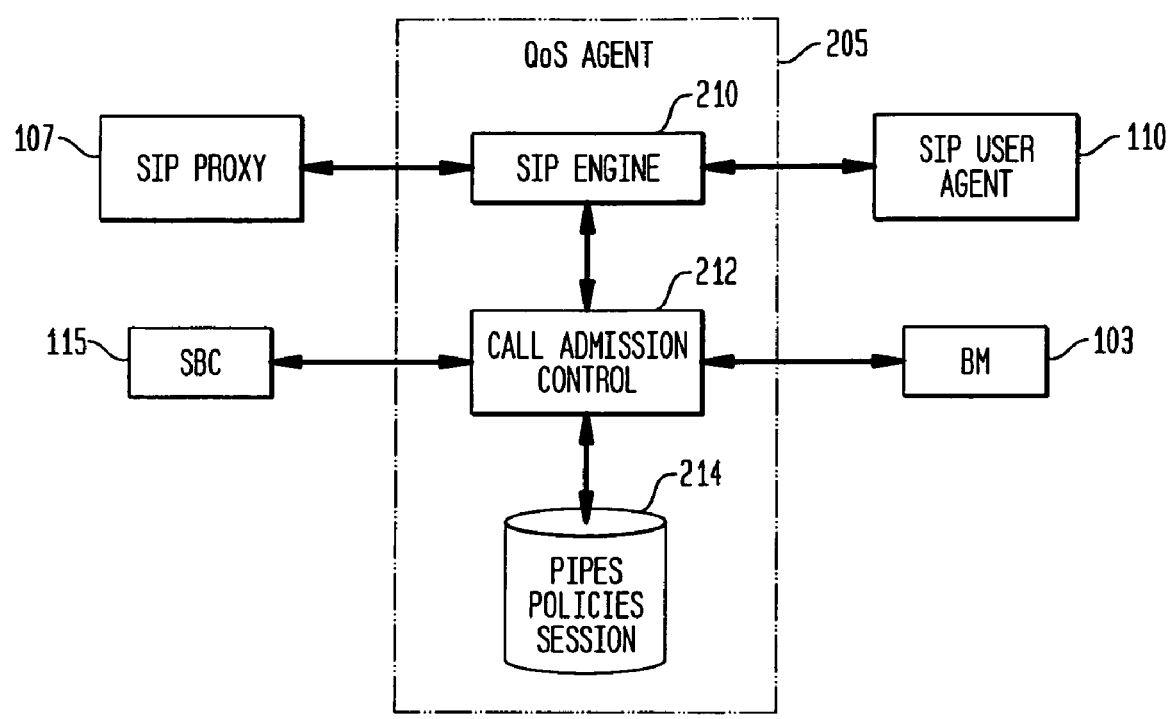
FIG. 2 shows the main components of a QoS Agent, according to an exemplary embodiment of the present invention.

As mentioned before, QoS Agent 105 is responsible for admitting/rejecting SIP sessions based on bandwidth availability in pipes 130 and governing established policies. FIG. 2 shows the main components of the QoS Agent. SIP Engine 210 intercepts SIP messages, processes them, communicates with Call Admission Control (CAC) 212, and forwards the possibly modified SIP messages. The modification to the SIP messages is described below. The function of CAC 212 is to process SIP Engine requests, determine session admission decisions, and manage policies that govern the QoS Agent 205. Persistent data that is essential to the operation of the QoS Agent 205 is stored in the QoS Agent database 214. This data includes information on pipes, sessions, and policies.

The SIP Engine processes the following SIP methods: INVITE, ACK, BYE, CANCEL, and REFER and the corresponding SIP responses. INVITE: Upon receipt of SIP Invite, the SIP Engine determines the session BW requirement from the codec specified in the SDP (Session Description Protocol) record in the Invite message. Table 1 shows a sample of SDP record in an Invite message; the SIP Engine 210 determines that the source UA agent 110 supports the PCMU codec for audio; this allows the SIP Engine 210 to determine that the bandwidth requirement of the session is 8000×8=64 Kbps in each direction.

TABLE 1

A Sample SDP Record v=0
o=UserA 2890844526 2890844526 IN IP4 here.com
s=Session SDP
c=IN IP4 100.101.102.103
t=0 0
m=audio 49172 RTP/AVP 0
a=rtpmap:0 PCMU/8000

Once the bandwidth requirements are computed, the SIP Engine 210 requests that the CAC 212 check whether enough resources are available to accommodate the session. If the response is "accept", then the SIP Engine 210 modifies the SIP Invite by inserting the field "Record-Route" in the SIP header. This is needed to force subsequent SIP methods (e.g., ACK, BYE, CANCEL) to traverse the SIP Engine 210 in the QoS Agent 205. It also adds the field "Via" in the SIP header to force responses to traverse the SIP Engine 210. Indeed, the Via header field indicates the path taken by the request thus far and indicates the path that should be followed in routing responses.

For instance, when the SIP Engine 210 receives Invite message with the header shown in Table 2, it produces a modified header as shown in Table 3.

TABLE 2

Sample SIP Invite Header Received by SIP Engine

INVITE sip:2294236651@69.25.116.193 SIP/2.0
Via: SIP/2.0/UDP 67.137.224.13:5060;branch=z9hG4bK27e1bec7;rport
From: "9726172877" <sip:9726172877@67.137.224.13>;tag=as6ff3443a
To: <sip:2294236651@69.25.116.193>
Contact: <sip:9726172877@67.137.224.13>

TABLE 2-continued

Sample SIP Invite Header Received by SIP Engine

Call-ID: 223956466fc735436229d290690280d9@67.137.224.13
CSeq: 102 INVITE
User-Agent: Asterisk PBX
Date: Mon, 06 Jun 2005 14:20:28 GMT
Allow: INVITE, ACK, CANCEL, OPTIONS, BYE, REFER, NOTIFY
Content-Type: application/sdp
Content-Length: 218

TABLE 3

Modified SIP Invite Header generated by SIP Engine

INVITE sip:2294236651@69.25.116.193 SIP/2.0
Via: SIP/2.0/UDP SIP.QoSAgent.COM:9999;branch=x9zDfbK27qosag9
Via: SIP/2.0/UDP 67.137.224.13:5060;branch=z9hG4bK27e1bec7;rport
From: "9726172877" <sip:9726172877@67.137.224.13>;tag=as6ff3443a
To: <sip:2294236651@69.25.116.193>
Contact: <sip:9726172877@67.137.224.13>
Record-Route: <sip:SIP.QoSAgent.COM:9999;lr>
Call-ID: 223956466fc735436229d290690280d9@67.137.224.13
CSeq: 102 INVITE
User-Agent: Asterisk PBX
Date: Mon, 06 Jun 2005 14:20:28 GMT
Allow: INVITE, ACK, CANCEL, OPTIONS, BYE, REFER, NOTIFY
Content-Type: application/sdp
Content-Length: 218

Once the SIP Invite header is modified, the SIP Engine 210 extracts the IP address and port number of the destination SIP UA (e.g., from the first line of the header that starts with INVITE: 69.25.116.193 as IP address and 5060 as the default port number) and forwards the message to the destination SIP UA.

If the CAC 212 responds with "rejection" (i.e., not enough resources are available to accommodate the session), the SIP Engine 210 produces a SIP response, of type 6xx (see Table 4), and sends it towards the source SIP UA. Meanwhile, the user gets a busy signal. Indeed, it sends it to the IP address and port number included in the "via" field that appears first in Invite message (IP address: 67.137.224.13 and port number: 5060 in the example shown in Table 2).

TABLE 4

"Rejection" Response generated by SIP Engine

SIP/2.0 606 Not Acceptable
Via: SIP/2.0/UDP 67.137.224.13:5060;branch=z9hG4bK27e1bec7;rport=5060
From: "9726172877" <sip:9726172877@67.137.224.13>;tag=as6ff3443a
To: <sip:2294236651@69.25.116.193>;tag=SD3gfk599-f3080002-0-1604826282
Call-ID: 223956466fc735436229d290690280d9@67.137.224.13
CSeq: 102 INVITE
Warning: 370 isi.edu "insufficient bandwidth"
Server: DC-SIP/1.2
Content-Length: 0

ACK: When the SIP Engine 210 receives an ACK message, it forwards the ACK to the destination SIP UA. BYE: When the SIP Engine 210 receives a BYE message, it notifies the CAC 212 that the session is terminated. It also provides the CAC 212 with the IP address and port number of the SIP UA 110 that generated the request. It extracts this information from the "via" field of the bottom-most "via" in the header' the UA that generates a SIP request, inserts the "via" field in the request. The CAC 212 returns the IP address and port number of the SIP UA to which the BYE should be sent.

Subsequently, the SIP Engine 210 forwards the BYE message to the SIP UA identified by the CAC.

CANCEL: When the SIP Engine 210 receives a CANCEL message, it notifies the CAC 212 that the session is cancelled. It also provides the CAC 212 with the IP address and port number of the SIP UA that generated the request. It extracts this information from the "via" field of the bottom-most "via" in the header; the UA that generates a SIP request, inserts the "via" field in the request. The CAC 212 returns the IP address and port number of SIP UA to which the CANCEL should be sent. Subsequently, the SIP Engine 210 forwards the CANCEL to the SIP UA identified by CAC. REFER: When the SIP Engine 210 receives a REFER message, it simply forwards the message to the destination SIP UA. When the SIP Engine 210 receives a SIP response, it first removes the (topmost) field "Via" field that first appears in the response (i.e., it corresponds to the "via" field inserted by the SIP Engine when receiving a SIP request). If the response is a non-2XX SIP response, it notifies CAC 212 that the session is to be terminated. Then, the SIP Engine forwards the SIP response to the source SIP UA.

The QoS Agent database stores network resource and policy information that is needed for the operation of the QoS Agent. The CAC component of the QoS Agent accesses this database. The database contains three types of tables. Pipes table contains information about pipes that currently exist in the service provider network. Each pipe record includes the following information: pipe identifier, source user subnet, destination user subnet, initial provisioned bandwidth for each DiffServ class, current provisioned bandwidth for each DiffServ class, and available bandwidth for each DiffServ class. Initially, available bandwidth is equal to initial provisioned bandwidth. The CAC 212 updates available bandwidth of pipes by updating the pipes data each time a session is accepted or terminated.

Policies table contains policy information. Each policy record includes a policy type and corresponding policy attributes. Three policy types are supported: Pipe Bandwidth Increase Policy, Pipe Bandwidth Decrease Policy, and Session QoS Degradation Policy. Each policy type has its own set of attributes. Pipe Bandwidth Increase Policy: This policy controls increases to bandwidth allocated to a pipe when its utilization goes above a threshold. This policy is defined using a tuple of the following form: <T, NP, NF> where T and NP are numbers between 0 and 100, and NF is a number that specifies bandwidth value in units of Kb/s. In one exemplary embodiment, this policy controls the allocation of bandwidth to pipes in the following manner: If the bandwidth available on a pipe, i.e., bandwidth that is not allocated to any SIP session flow, is less than or equal to (T/100*Current Provisioned Bandwidth), the bandwidth of the pipe is increased by max (NF, NP/100*Current Provisioned Bandwidth). This policy enables flexible and dynamic control of bandwidth provisioned to pipes. If T is 0, the scheme operates in reactive mode; i.e., only when the available bandwidth of a pipe is zero, the provisioned bandwidth is increased. If T>0, the scheme operates in proactive mode; i.e., when the available bandwidth of a pipe is less than the specified threshold, the provisioned bandwidth is increased.

Pipe Bandwidth Decrease Policy: This policy controls decreases to bandwidth allocated to a pipe when its utilization goes below a threshold. This policy is applied only if the current provisioned bandwidth is greater than the initial provisioned bandwidth. (That is, the bandwidth in never decreased below the initial provisioned bandwidth). This policy may be defined using a tuple of the following form: <T, NP, NF> where T and NP are numbers between 1 and 100, and NF is a number that specifies bandwidth value in units of Kb/s. This policy controls the provisioned bandwidth to pipes in the following manner: If the bandwidth available on a pipe is more than (T/100*Current Provisioned Bandwidth), the bandwidth of the pipe is decreased by max (NF, NP/100*Current Provisioned Bandwidth).

Session QoS Degradation Policy: This policy establishes rules on allocation of DiffServ Code Points (DSCPs) to different types of data flows that may be used within SIP sessions. Each such rule is defined using a tuple of the following form: <FT, Default DSCP, Degraded DSCP> where FT denotes a flow type as defined in SIP standards, Default DSCP is the default DiffServ class for the flow type, and Degraded DSCP is the degraded DiffServ class that can be assigned to a flow of the flow type if QoS degradation is enabled and pipe bandwidth increase is not possible due to either resource limitations or policy rules. For example, voice flows are usually assigned the DiffServ class Expedited Forwarding (EF). The scheme will accept new voice sessions (in the case no EF bandwidth is available) with the diffServ class Assured Forwarding (AF).

Finally, the sessions table contains information about sessions that are currently active in the network. Each session record includes the session identifier, source IP address, destination IP address, and the following information on each flow in the session: source port, destination port, bandwidth and DiffServ class. The CAC 212 keeps track of sessions in the network by creating a session record each time a session starts and deleting the record of a session that terminates.

When the QoS Agent module is initiated, the CAC 212 uses the primitive discover, provided by the Bandwidth Manager 103, to obtain the list of pipes that have been already setup. It stores the list of pipes in the QoS Agent database 214. The CAC 212 retrieves the enforcement policies from the QoS Agent database 214. Then it sets up a process that continuously monitors conditions in bandwidth increase/decrease policies to determine when to trigger bandwidth increase/decrease actions. To perform bandwidth increase/decrease, the CAC 212 invokes the Bandwidth Manager 103 using the modify primitive.

The behavior of CAC 212 in response to SIP Engine requests is as follows. SIP Engine request in response to Invite: Upon receipt of the SIP Engine request, the CAC uses the source subnet and the destination subnet to obtain from the database the pipe 130 that is setup between these two subnets. Subsequently, it checks whether this pipe has enough available bandwidth to accommodate the request. If the result is yes, it updates the value of the available bandwidth of the pipe, creates a record for the new session in the database, and returns an "accept" message to the SIP Engine. If the CAC 212 determines that not enough resources are available to accommodate the request, it simply returns a "reject" message. If bandwidth is not available for a flow in the default DiffServ class but is available in a degraded class, the CAC 212 admits the flow in the degraded class (if the predefined policies allow it), and directs the ingress SBC 115 to reconfigure the marking policies for that specific flow.

The CAC's admission decision is based on a simple comparison operation to check the availability of bandwidth in the pipe 130 that is configured to transport the session traffic. The CAC 212 does not communicate with the BM 103 for resource reservation per session basis. This design decision makes the proposed solution scalable and minimizes the impact on the response time of the session setup. The delay added by the QoS Agent 105 is negligible compared to the session setup response time; the impact is minimal.

SIP Engine request in response to a SIP response non-2xx: Upon receipt of a request from the SIP Engine 210, the CAC 212 removes the corresponding session record and updates the available bandwidth of the pipe used to carry the request.

SIP Engine request in response to BYE: Upon receipt of SIP Engine request, the CAC 212 removes the corresponding session record, updates the available bandwidth of the pipe 130 used to carry the session (i.e., increase the available bandwidth of the pipe by the bandwidth of the session to be terminated), and determines the IP address and the port number of the SIP UA (destination) to whom the SIP Engine should forward the request. The determination comprises obtaining the corresponding session record, and identifying the IP address and port number that is different from the IP address and port number delivered by the SIP Engine.

SIP Engine request in response to CANCEL: Upon receipt of SIP Engine request, the CAC 212 removes the corresponding session record, updates the available bandwidth of the pipe used to carry the request (i.e., increase the available bandwidth of the pipe by the bandwidth of the session to be terminated), and determines the IP address and the port number of the SIP UA to whom the SIP Engine should forward the request. The determination consists of getting the corresponding session record, and identifying the IP address and port number that is different from the IP address and port number delivered by the SIP Engine.

Operations Scenarios:

This section describes several operations scenarios that illustrate the working of the proposed scheme.

Figure 3A:
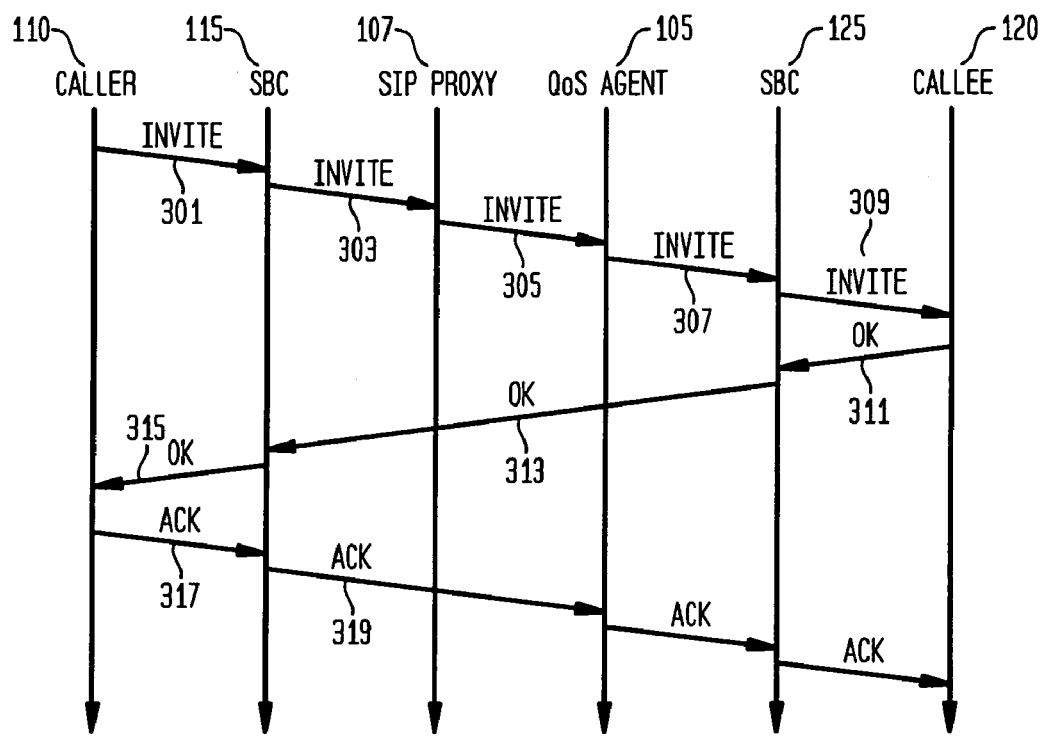
FIGS. 3A and 3B show the process flow for a session setup, according to an exemplary embodiment of the present invention.

Regular Session Setup: FIG. 3 shows the process flow for a session setup. FIG. 3A shows a successful setup. To setup a session, a user 110 sends an Invite message 301 to the corresponding SBC 115, wherein the SBC 115 may be configured as a proxy for all SIP agents of a given access network. The SBC 115 is configured to forward (303) SIP messages to the SIP server 107. Upon receipt of a SIP request, the SBC 115 parses the request and creates a state for the session, then forwards the request (303) to the SIP server 107 for processing. The SIP server 107 performs its own processing, updates the SIP message, and forwards it (305) to the QoS Agent 105 for admission control. The QoS Agent 105 decides whether to accept the session or not depending on the availability of resources. In this case, the QoS Agent accepts and forwards (307) the invite to the destination SBC 125. Note that ACK messages may be intercepted by the SIP server 107. It only needs to add the "Record-Route" field in the header of the Invite message before forwarding. The SIP Proxy 107 may or may not intercept an ACK message. This has no impact on the QoS Agent 105 behavior. All SIP messages and media streams traverse the SBCs.

Figure 3B:
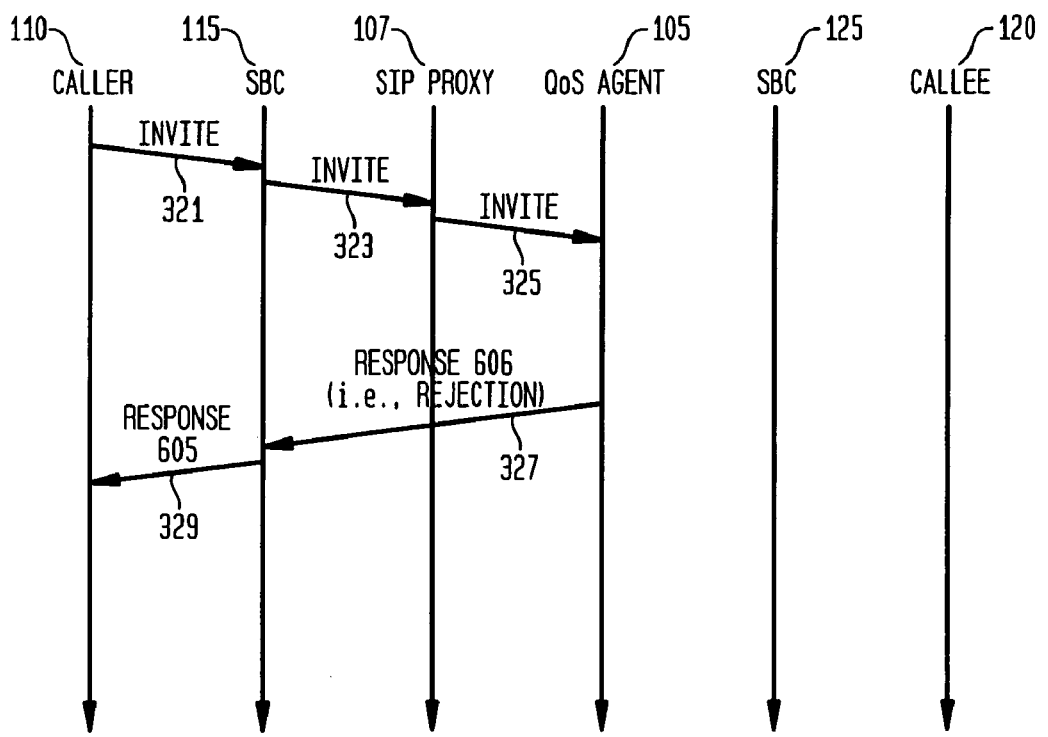

FIG. 3B shows the process flow of a call setup failure due to resources shortages. In this case, the QoS Agent 105 returns a rejection message ("SIP/2.0 606 Not Acceptable") to the caller (327, 329).

Figure 4:
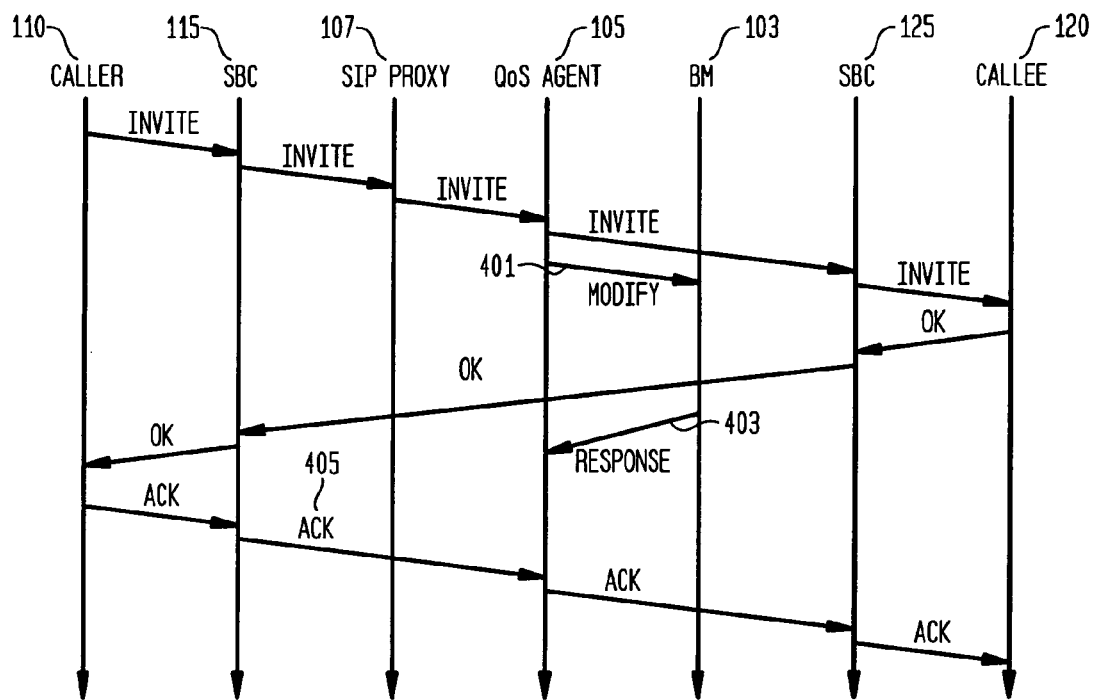
FIG. 4 shows the process flow of a session setup in support of reactive bandwidth increase, according to an exemplary embodiment of the present invention.

FIG. 4 shows the process flow of a session setup in support of reactive bandwidth increase. Upon receipt of the SIP request (400), the QoS Agent 105 determines it cannot accommodate the request. Subsequently, it polls the BM 103 for more bandwidth (401); the amount or percentage of the increase is specified by the policy stored in the QoS Agent database. In this case, we use an "optimistic" approach to speed up the session setup; that is, the QoS Agent 105 does not wait for the BM 103 response to forward the SIP request. In this example, the QoS Agent 105 gets the BM response (403) before getting the ACK message (405) from the caller 110. Thus, the session is successfully setup. With the optimistic approach, there is a risk that the QoS Agent 105 will not be able to accommodate the request in case the BM 103 is not able to provision the new requested bandwidth; in this case, the QoS Agent sends a SIP Cancel message to both users.

Figure 5:
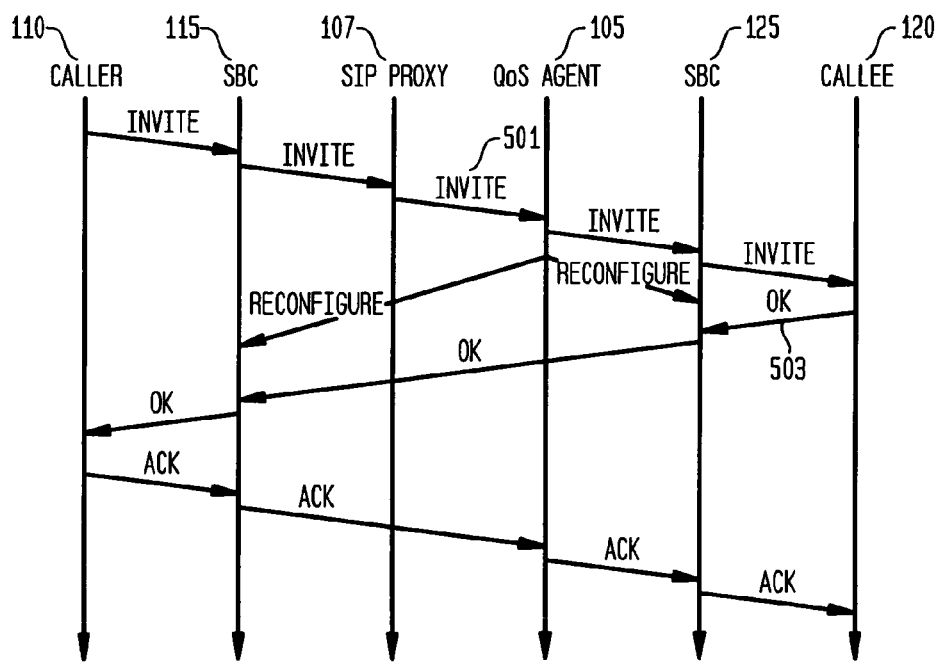
FIG. 5 shows the process flow of a session setup in support of a session admission with degraded QoS policy, in accordance with an exemplary embodiment of the present invention.

FIG. 5 shows the process flow of a session setup in support of a session admission with degraded QoS policy. Upon receipt of the SIP request (501), the QoS Agent 105 determines it cannot accommodate the request. There is no predefined policy that allows increasing the provisioned bandwidth. However, there is a predefined policy that allows for session admission with QoS degradation to, for instance, AF class of service. Thus, the QoS Agent 105 accesses the SBCs 115 and 125, and reconfigures them to mark the traffic of the session being processed with AF marking. The session is accepted (503) with a degraded QoS. When the session terminates (e.g., BYE), the QoS agent 105 cancels/terminates the SBC's reconfiguration for that session.

Call Forwarding and Call Transfer-based Session Setup

Call Forwarding is a feature allowing the destination/callee to redirect a call, from a caller, to another location (e.g., phone number). Three different call forwarding models are considered: 1. Proxy Server Based Forwarding, 2. Receiver Based Call Forwarding based on 'Moved Temporarily' Response, and 3. Receiver Based Call Forwarding based on REFER method. Each of these is described in conjunction with the process flow for setting up a session as in FIG. 3A.

Figure 6:
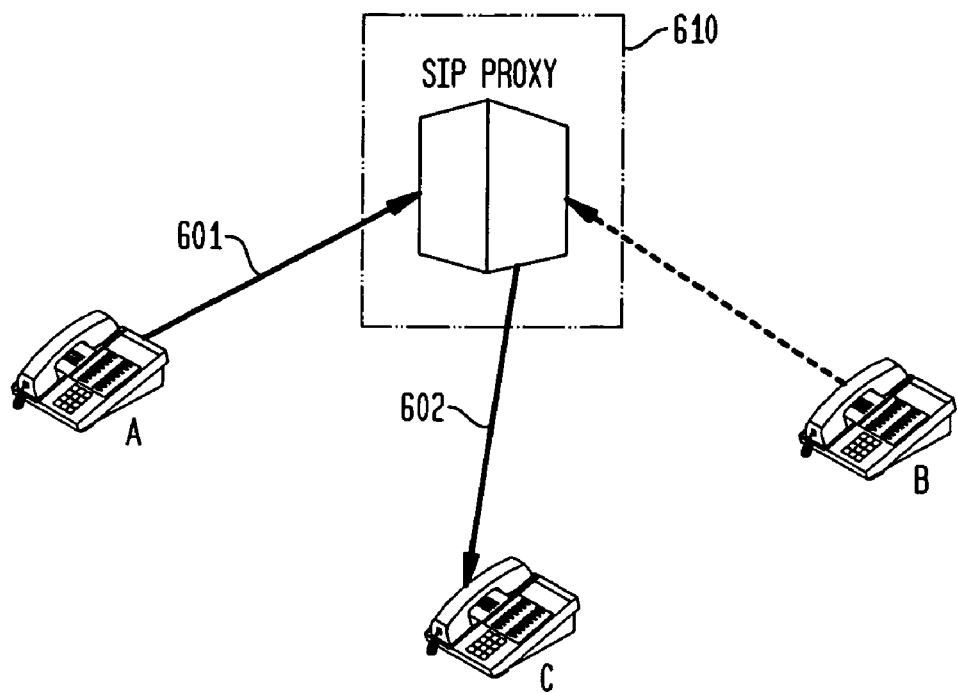
FIGS. 6-9 show example scenarios of call forwarding and call transfer working in conjunction with exemplary embodiments of the present invention.

In the Proxy Server Based Forwarding model, users need to register their new locations with the SIP Proxy server so that calls to them can be properly be redirected to their intended locations. FIG. 6 shows an example scenario. Bob, using phone B, sets the new location on his phone—the UA registers new location C to the SIP Proxy Server 610. Adam, using phone A, calls Bob—Adam generates a call request 601 to the SIP Proxy Server 610. The SIP Proxy Server 610 discovers that Bob is at C, thus forwards the call request to C. The process flow in this case is similar to the regular session setup; the SIP request forwarded by the SIP server 610 to the QoS Agent 105 includes the new location of the callee. Thus, the QoS Agent 105 processes the session setup request between the caller (A) and the new location (C) of the callee.

Figure 7A:
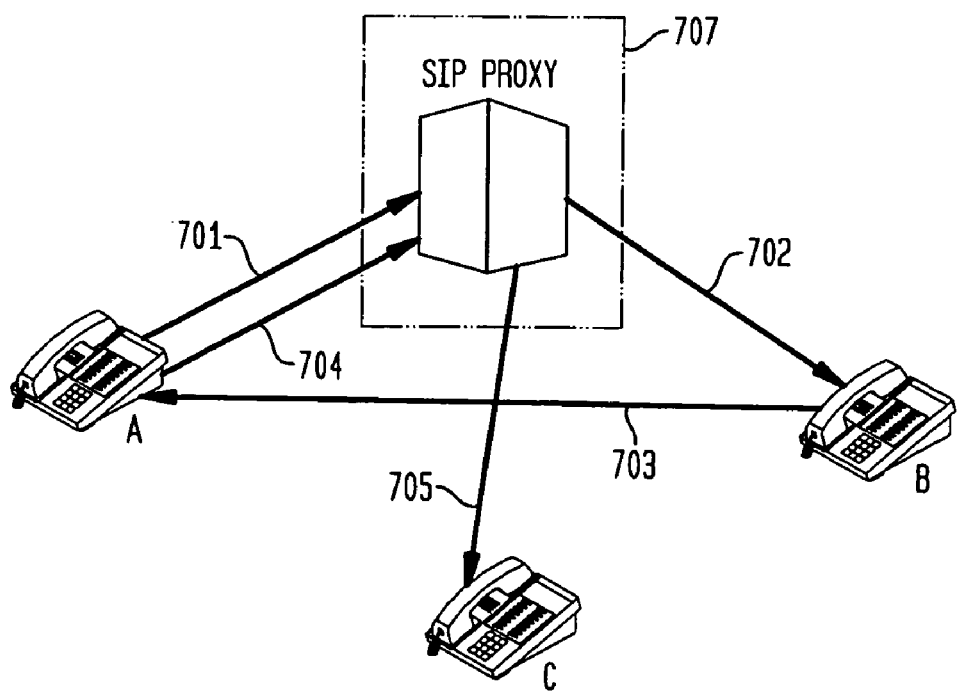
Figure 7B:
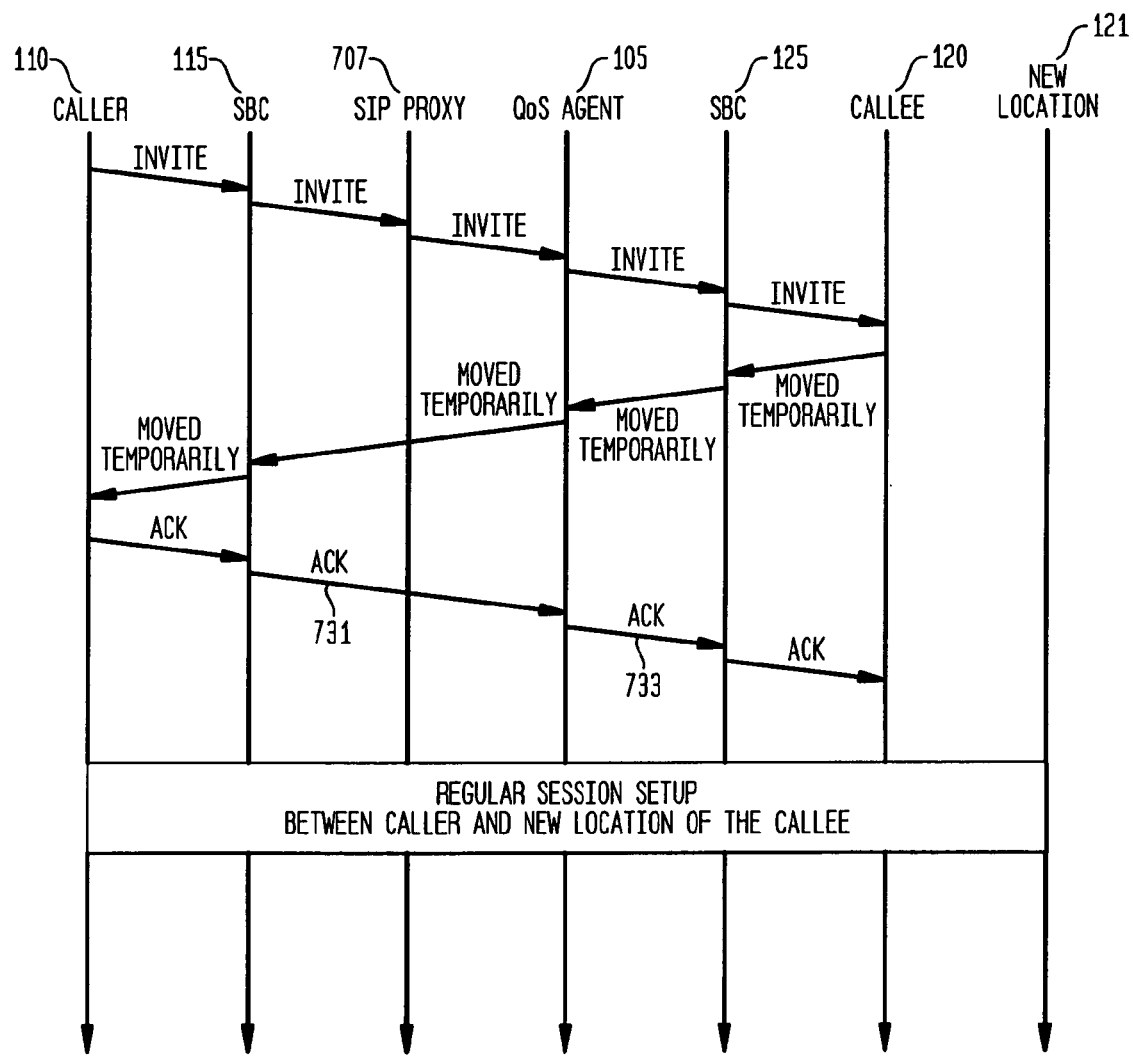

FIGS. 7A and 7B respectively show a simple call scenario and a corresponding session setup based on the Receiver Based Call Forwarding based on 'Moved Temporarily' Response. In FIG. 7A, Adam, at A, calls Bob, at B—Adam sends a call request 701 to the SIP Proxy Server 707. The Proxy Server forwards the call request 702 to Bob at B. The UA at B replies to A with a 'Moved-temporarily' response 703 with Bob's new temporary location C. Adam's UA at A sends a call request 704 to the SIP Proxy Server with the new location (e.g., phone number) of Bob. The SIP Proxy Server forwards the request 705 to C.

FIG. 7B shows the process flow of a session setup using Call Forwarding based on the "Moved temporarily" Response. When the QoS Agent 105 receives the "Moved temporarily" response, it releases the bandwidth provisioned for the call between the caller and the callee in the initial location. Upon receipt of Ack (731), the QoS Agent 105 looks for the corresponding call identifier in the QoS Agent database. The QoS Agent 105 cannot locate it since it has been released when processing the "Moved temporarily" response. Subsequently, it forwards the Ack (733) towards the callee 120. A process flow similar to the one shown in FIG. 3A is then used to setup a new session between the caller and the callee in the new location 721.

Figure 8A:
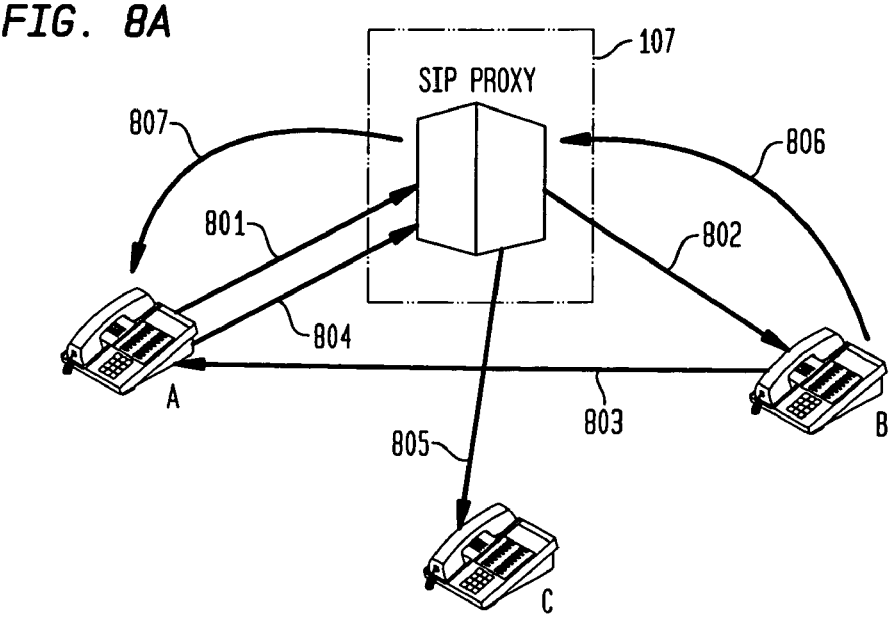
Figure 8B:
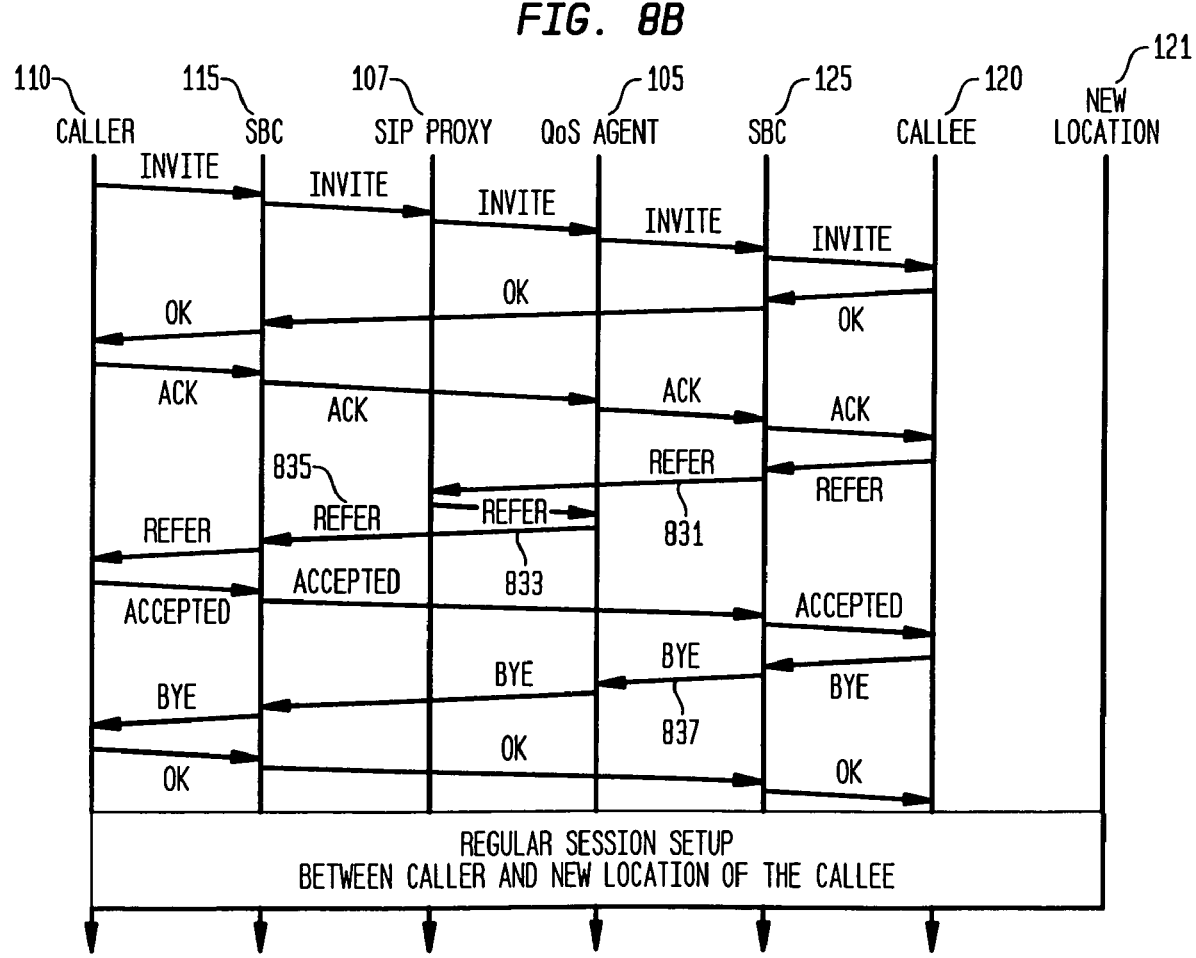

Similarly, FIGS. 8A and 8B show a simple Receiver Based Call Forwarding scenario based on the REFER method. In FIG. 8A, Adam, at A, calls Bob, at B—Adam sends a call request 801 to the SIP Proxy Server. The Proxy Server forwards the call request 802 to Bob at B. The Phone at B sends a 'REFER' request 803 to A. (REFER carries C's address). Adam's UA at A sends a call request 804 to SIP Proxy Server. The SIP Proxy Server forwards the request 805 to C. Then, B sends a BYE message 806 to the SIP Proxy Server. The Proxy Server forwards a BYE message 807 to A.

FIG. 8B shows the process flow of a session setup with Call Forwarding based on the above REFER method. In this scenario, the SIP User Agent at the callee's initial location 120 is configured to generate the REFER message and send it (831) to the SIP Proxy 107. When the QoS Agent 105 receives the REFER message (833) from the SIP Proxy 107, it simply forwards it (835) to the caller 110. Upon receipt of a BYE message (837), the QoS Agent 105 releases the bandwidth reserved for the initial session (caller and callee in the initial location). Then, a process flow similar to the one shown in FIG. 3 is used to setup a new session between the caller and the callee in the new location 121.

Figure 9A:
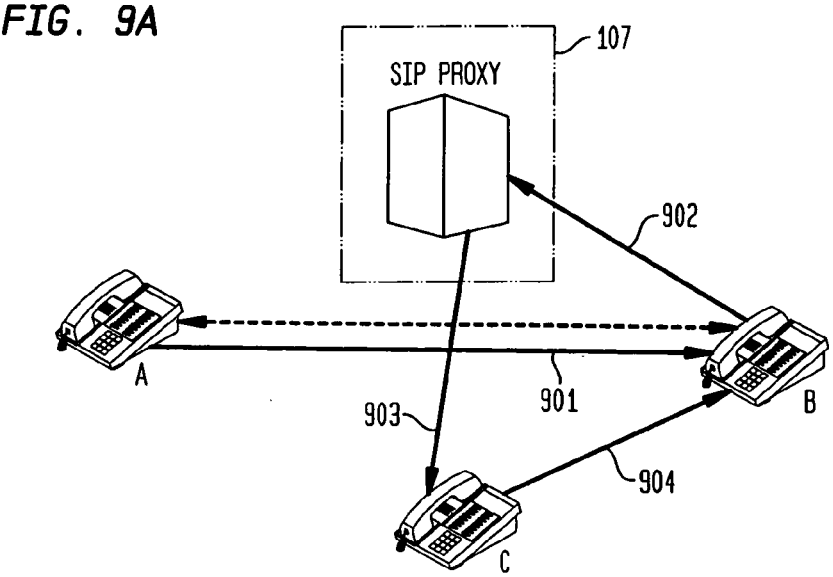
Figure 9B:
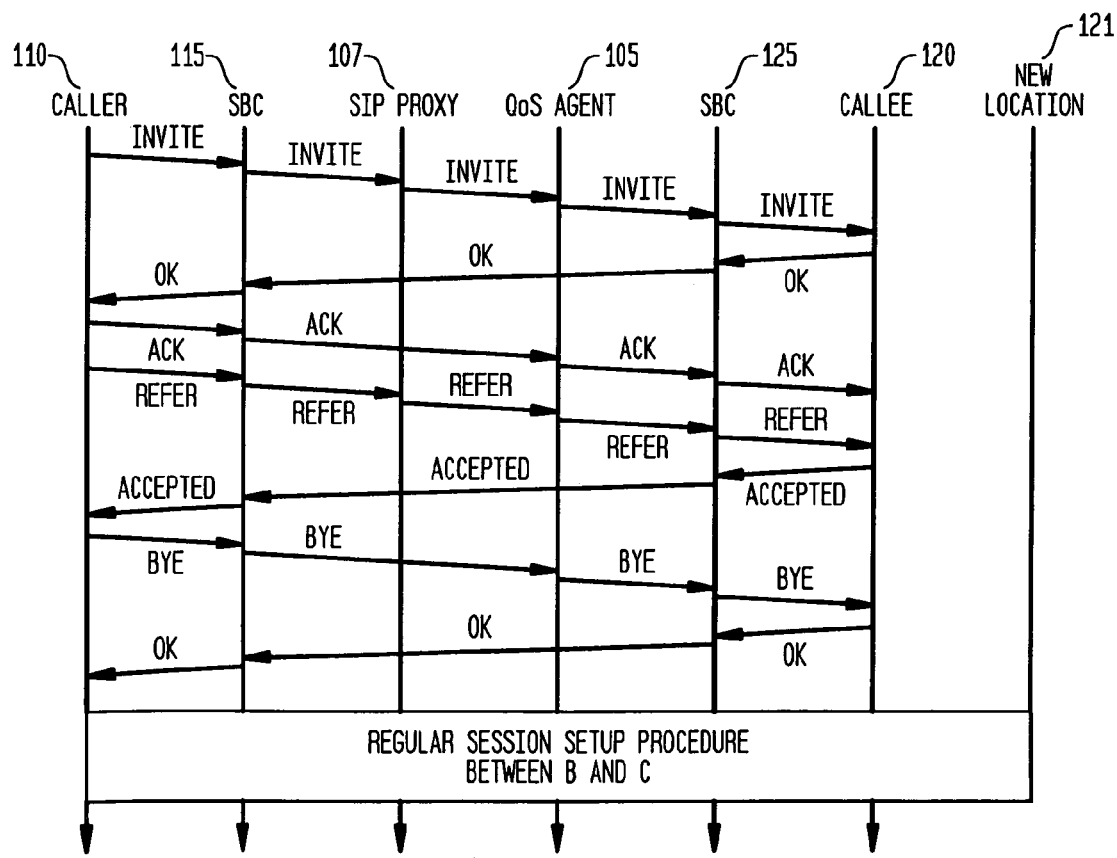

Finally, a simple call scenario based on call transfer using the REFER method is shown in FIGS. 9A and 9B. In FIG. 9A, A and B talk on the phone. A sends a transfer request 901 to B with C's location/number. B sends a call request 902 to the SIP Proxy Server 107. SIP Proxy Server 107 forwards the call request 903 to C. B and C talk. A hangs up and is disconnected.

FIG. 9B shows the process flow of a session setup with Call Transfer using the REFER method. When the QoS Agent 105 receives a REFER message, it simply forwards it to the callee 120. Upon receipt of BYE, it releases the bandwidth reserved for the initial session (caller A and B). Subsequently, a process flow similar to the one shown in FIG. 3 is used to setup a new session between the new caller (B) and C.

While preferred embodiments of the present invention have been described using specific terms, such description is for illustrative purposes only, and it is to be understood that changes and variations may be made without departing from the spirit or scope of the following claims.

What is claimed is:

1. A system executed by a computer for transparently assuring quality of service (QoS) for Session Initiation Protocol (SIP) users and applications in a SIP session between a source user network and a destination user network communicating via a Differentiated Services (DiffServ) core network, each user network having a source and destination SIP user agent respectively, the system comprising:

a Bandwidth Manager to provision pipes in the core network between source user networks and destination user networks, wherein each pipe is configured to transport a plurality of traffic flows of a plurality of DiffServ classes that are communicated via SIP sessions between a source user network and a destination user network;

a QoS Agent for accepting and/or rejecting a SIP session by checking for availability of bandwidth in the pipe for each incoming traffic flow of the SIP session first for the default DiffServ class for the traffic flow and if that bandwidth is not available then checking for bandwidth availability for the degraded class for the traffic flow as specified by the Session QoS Degradation policy, admitting the flow only if bandwidth is available either for its default DiffServ class or for its degraded DiffServ class, and reconfiguring the marking policies for an admitted flow in the ingress Session Border Controller if the flow is admitted in its degraded DiffServ class;

where the QoS Agent determines the session bandwidth requirement from a header in an incoming SIP Invite message, increases or decreases the bandwidth of the pipe based on a plurality of predetermined policies on high and low thresholds on pipe bandwidth allocated to SIP sessions, pipe bandwidth increments and pipe bandwidth decrements;

a Session Border Controller between each user network and the core network to police an incoming packet and mark said incoming packet with Differentiated Services (DiffServ) code points based on policies configured by the QoS Agent; and a SIP proxy server between the source SIP user agent and destination SIP user agent, wherein the SIP proxy server is configured to forward all incoming SIP requests to the QoS Agent.

2. The system of claim 1, wherein the Bandwidth Manager provisions the pipe in the core network with an initial bandwidth for each DiffServ class based on a projected traffic demand for the DiffServ class that is to be transported by the pipe between the source and destination user networks, and increases or decreases the bandwidth of the pipe for each DiffServ class based on directives from the QoS Agent.

3. The system of claim 2, wherein, the QoS Agent further comprising:
　　a SIP Engine to intercept and process SIP messages;
　　a Call Admission Control in communication with the SIP Engine to determine session admissions; and
　　a QoS Agent database.

4. The system of claim 3, wherein the QoS Agent Database further comprises:
　　a pipes table containing for each pipe provisioned in the core network, information about its initial provisioned bandwidth for each DiffServ class, current provisioned bandwidth for each DiffServ class, and available bandwidth for each DiffServ class; and
　　a policies table containing information about pipe bandwidth increase policy specifying the high threshold on pipe bandwidth allocated to SIP sessions that triggers bandwidth increase and the size of bandwidth increment, pipe bandwidth decrease policy specifying the low threshold on pipe bandwidth allocated to SIP sessions that triggers bandwidth decrease and the size of bandwidth decrement, and Session QoS degradation policy specifying the default DiffServ class and the degraded DiffServ class for each traffic flow type.

5. The system of claim 3, wherein the Call Admission Control rejects a SIP session if there is insufficient bandwidth in the pipe for a traffic flow contained in the session for both the default DiffServ class and the degraded DiffServ class associated with the flow.

6. The system of claim 5, wherein the Call Admission Control refers to the QoS Agent database to obtain bandwidth availability information on pipes in the core network between the source and destination networks.

7. A method operable on a computer for assuring Quality of Service (QoS) in a Session Initiation Protocol (SIP) session between at least two user networks communicating across a Differentiated Services (DiffServ)-enabled core network, the method comprising:
　　provisioning a pipe in the core network between each of the at least two user networks, said pipe having a bandwidth for each of a plurality of DiffServ types for traffic that are communicated via SIP sessions between the said user networks;
　　checking for availability of bandwidth in the pipe for each incoming traffic flow of the SIP session first for the default DiffServ class for the traffic flow and if that is not available then checking for bandwidth availability for the degraded class for the traffic flow as specified by the Session QoS Degradation policy;
　　admitting the flow only if bandwidth is available either for its default DiffServ class or for its degraded DiffServ class;
　　reconfiguring the marking policies for an admitted flow in the ingress Session Border Controller if the flow is admitted in its degraded DiffServ class;
　　keeping track of available bandwidth on each pipe in the core network for each DiffServclass configured on the pipe, and either increasing the bandwidth provisioned for the class in the pipe if the pipe bandwidth allocated to SIP sessions goes above the high threshold or decreasing the bandwidth provisioned for the class in the pipe if the pipe bandwidth allocated to SIP sessions goes below the low threshold.

8. The method of claim 7, further comprising:
　　defining a plurality of policies, including a pipe bandwidth increase policy specifying the high threshold on pipe bandwidth allocated to SIP sessions and the size of bandwidth increment, a pipe bandwidth decrease policy specifying the low threshold on pipe bandwidth allocated to SIP sessions and the size of bandwidth decrement, and a session QoS degradation policy specifying the default DiffServ class and the degraded DiffServ class for each traffic flow type.

9. The method of claim 7, further comprising sending all incoming SIP session requests to a QoS Agent, said QoS Agent comprising a SIP Engine, a Call Admission Control, and a QoS Agent database.

10. The method of claim 9, wherein the marking and policing of incoming packets by the SBC is governed by a plurality of rules that are configured by the QoS Agent.

11. The method of claim 9, wherein checking for availability of bandwidth further comprises:
　　determining the available bandwidth in the pipe by communicating with the QoS Agent database.

\* \* \* \* \*

UNITED STATES PATENT AND TRADEMARK OFFICE
CERTIFICATE OF CORRECTION

PATENT NO.           : 8,301,744 B2                                           Page 1 of 1
APPLICATION NO.      : 12/188421
DATED                : October 30, 2012
INVENTOR(S)          : Bogovic et al.

It is certified that error appears in the above-identified patent and that said Letters Patent is hereby corrected as shown below:

In the Specification

In Column 5, Line 50, delete "BM 130" and insert -- BM 103 --, therefor.

In Column 5, Line 67, delete "setup" and insert -- setup. --, therefor.

In Column 11, Line 56, delete "Ack" and insert -- ACK --, therefor.

In Column 11, Line 60, delete "Ack" and insert -- ACK --, therefor.

In the Claims

In Column 13, Line 21, in Claim 3, delete "wherein," and insert -- wherein --, therefor.

In Column 14, Line 23, in Claim 7, delete "DiffServclass" and insert -- DiffServ class --, therefor.

Signed and Sealed this
Eighteenth Day of November, 2014

Michelle K. Lee
*Deputy Director of the United States Patent and Trademark Office*